United States Patent
Dharmaraj et al.

(10) Patent No.: US 10,207,826 B2
(45) Date of Patent: Feb. 19, 2019

(54) ARTIFICIAL GRAVITY SYSTEM WITH A UNIBODY ROTATING STRUCTURE THAT ROTATES ABOUT A STATIONARY STRUCTURE

(71) Applicant: The Boeing Company, Chicago, IL (US)

(72) Inventors: Raju Dharmaraj, League City, TX (US); Ian Falkinham, Houston, TX (US)

(73) Assignee: The Boeing Company, Chicago, IL (US)

(*) Notice: Subject to any disclaimer, the term of this patent is extended or adjusted under 35 U.S.C. 154(b) by 303 days.

(21) Appl. No.: 15/292,081

(22) Filed: Oct. 12, 2016

(65) Prior Publication Data

US 2018/0099766 A1 Apr. 12, 2018

(51) Int. Cl.
*B64G 1/60* (2006.01)
*B64G 1/12* (2006.01)

(52) U.S. Cl.
CPC ............ *B64G 1/60* (2013.01); *B64G 1/12* (2013.01)

(58) Field of Classification Search
CPC ... B64G 1/12; B64G 1/46; B64G 1/60; B64G 1/64
See application file for complete search history.

(56) References Cited

U.S. PATENT DOCUMENTS

| | | | | |
|---|---|---|---|---|
| 3,210,026 A | * | 10/1965 | Frisch | B64G 1/12 244/159.4 |
| 3,744,739 A | * | 7/1973 | Weaver | B64G 1/12 244/172.4 |
| 3,864,771 A | * | 2/1975 | Bauer | B63B 22/22 220/8 |
| 4,643,375 A | * | 2/1987 | Allen | B64G 1/60 244/171.9 |
| 6,216,984 B1 | * | 4/2001 | Brinsmade | B64G 1/12 244/159.4 |
| 6,523,782 B2 | * | 2/2003 | Barutt | B64G 1/12 244/171.9 |

(Continued)

OTHER PUBLICATIONS

Chung, Winchell. "Artificial Gravity." Retrieved from Internet Archive Wayback Machine as the website appeared on Jan. 9, 2016. URL for Internet Archive retrieval: <https://web.archive.org/web/20160109081205/http://www.projectrho.com/public_html/rocket/artificialgrav.php> (Year: 2016).*

*Primary Examiner* — Richard R. Green
*Assistant Examiner* — Michael B. Kreiner
(74) *Attorney, Agent, or Firm* — Duft & Bornsen, PC

(57) ABSTRACT

A habitation module that provides an artificial gravity environment. In one embodiment, the habitation module includes a stationary structure and a rotating structure that rotates about an axis in relation to the stationary structure. The rotating structure includes a cylindrical body that is substantially hollow and closed at both ends, where the ends represent gravity chambers of the habitation module. There are center openings in the cylindrical body that are coaxially aligned on opposing sides of the cylindrical body along an axis of rotation. First and second hub members are permanently affixed to the cylindrical body on the opposing sides of the cylindrical body about the center openings. Radial seals that span gaps between the rotating structure and the stationary structure.

23 Claims, 17 Drawing Sheets

(56) References Cited

U.S. PATENT DOCUMENTS

| | | | | |
|---|---|---|---|---|
| 6,547,189 | B1* | 4/2003 | Raboin | B64G 1/12 |
| | | | | 244/158.3 |
| 9,090,361 | B2* | 7/2015 | Clay | B64G 1/14 |
| 9,359,091 | B2* | 6/2016 | Biddlecom | B64G 1/46 |
| 9,776,743 | B2* | 10/2017 | Dharmaraj | B64G 1/46 |
| 9,908,644 | B2* | 3/2018 | Dharmaraj | B64G 1/60 |
| 9,994,338 | B2* | 6/2018 | Dharmaraj | B64G 1/46 |
| 10,059,469 | B2* | 8/2018 | Dharmaraj | B64G 1/12 |
| 10,077,121 | B2* | 9/2018 | Dharmaraj | B64G 1/60 |
| 2014/0124627 | A1* | 5/2014 | Clay | B64G 1/14 |
| | | | | 244/159.3 |
| 2017/0197734 | A1* | 7/2017 | Dharmaraj | B64G 1/12 |
| 2017/0197735 | A1* | 7/2017 | Dharmaraj | B64G 1/46 |
| 2017/0197736 | A1* | 7/2017 | Dharmaraj | B64G 1/60 |
| 2017/0197737 | A1* | 7/2017 | Dharmaraj | B64G 1/60 |
| 2017/0197738 | A1* | 7/2017 | Dharmaraj | B64G 1/46 |
| 2017/0240302 | A1* | 8/2017 | Dharmaraj | B64G 1/60 |
| 2017/0240303 | A1* | 8/2017 | Dharmaraj | B64G 1/60 |
| 2017/0361950 | A1* | 12/2017 | Dharmaraj | B64G 1/46 |

* cited by examiner

ARTIFICIAL GRAVITY SYSTEM WITH A UNIBODY ROTATING STRUCTURE THAT ROTATES ABOUT A STATIONARY STRUCTURE

FIELD

This disclosure relates to the field of habitation modules that provide artificial gravity environments.

BACKGROUND

When humans occupy a space station, they encounter a zero-gravity environment or "weightless" environment. Extended exposure to a zero-gravity environment can be detrimental to the health of the human occupants, such as muscle and bone degeneration. To avoid these long-term health effects, artificial gravity environments may be installed in the space station. One way to create artificial gravity is with centrifugal force, where a vessel rotates at a speed that drives a human occupant inside of the vessel toward the outer hull of the vessel. The force on the human occupant feels like a gravitational pull.

Because of the health benefits and comfort of artificial gravity, it is desirable to design improved artificial gravity environments for space habitats/vehicles.

SUMMARY

Embodiments described herein include a habitation module for a space station or the like that includes a stationary structure and a rotating structure that is slid upon the stationary structure. The rotating structure is a unitary body having gravity chambers at each end, and having a cylindrical opening through its center so that the rotating structure can slide onto the stationary structure. The rotating structure is driven to rotate about an axis in relation to the stationary structure to create artificial gravity within each of the gravity chambers. Because it may be beneficial to have the interior of the gravity chambers pressurized so that crew members don't need to wear pressurized suits, radial seals are installed at the connection points between the rotating structure and the stationary structure. The radial seals provide an air-tight juncture between the rotating structure and the stationary structure. As the artificial gravity environment is created in the gravity chambers, crew members may enter the gravity chambers for exercise, rest, lounging, or other activities. The artificial gravity environment provides health benefits to the crew members.

One embodiment comprises a habitation module that includes a stationary structure, and a rotating structure that attaches to the stationary structure through rotatable attachment members, and rotates about an axis in relation to the stationary structure. The stationary structure includes a first circular side wall, a second circular side wall spaced apart from the first circular side wall and aligned axially, and one or more support beams that attach the first circular side wall and the second circular side wall. The rotating structure includes a cylindrical body that is substantially hollow and closed at both ends, where each end of the cylindrical body represents a gravity chamber of the habitation module. Center openings in the cylindrical body are coaxially aligned on opposing sides of the cylindrical body along an axis of rotation of the cylindrical body. The rotating structure further includes a first hub member and a second hub member that are permanently affixed to the cylindrical body on the opposing sides of the cylindrical body about the center openings. The habitation module further includes a first radial seal that spans a first gap between the first hub member and the first circular side wall to form an air-tight seal around a circumference of the first circular side wall, and a second radial seal that spans a second gap between the second hub member and the second circular side wall to form an air-tight seal around a circumference of the second circular side wall.

In another embodiment, the rotatable attachment members comprise a pair of support bearings. A first one of the support bearings connects the first hub member to the first circular side wall, and a second one of the support bearings connects the second hub member to the second circular side wall.

In another embodiment, the first hub member and the second hub member are saucer-shaped, and each includes a rim, an annular base, and a continuous side wall that has a concave shape as it extends from the rim to the annular base. The rim has a shape that corresponds with an outline of the center openings in the cylindrical body.

In another embodiment, the rim of each of the first hub member and the second hub member is welded around the outline of a center opening in the cylindrical body.

In another embodiment, a drive mechanism configured to rotate the rotating structure about the axis in relation to the stationary structure to simulate a gravitational force within the gravity chambers. A ring gear is affixed to an outer cylindrical surface of the annular base of the first hub member, and has teeth that mesh with teeth on the drive mechanism.

In another embodiment, the first circular side wall of the stationary structure includes a hatch, and the stationary structure further includes a docking mechanism that encircles the hatch for attaching the stationary structure to a module of a space station.

In another embodiment, the habitation module further includes a counter-rotating mechanism that rotates about the axis in an opposite direction than the rotating structure.

In another embodiment, the first circular side wall of the stationary structure includes a hatch, and the counter-rotating mechanism includes a cylindrical counter-weight that encircles the hatch. A drive mechanism rotates the cylindrical counter-weight about the axis in the opposite direction than the rotating structure.

In another embodiment, the drive mechanism adjusts a rotational speed of the cylindrical counter-weight to compensate for a change in mass within the gravity chambers.

Another embodiment comprises a habitation module that includes a stationary structure, and a rotating structure that attaches to the stationary structure through rotatable attachment members, and rotates about an axis in relation to the stationary structure. The stationary structure includes a first circular side wall, a second circular side wall spaced apart from the first circular side wall and aligned axially, and one or more support beams that attach the first circular side wall and the second circular side wall. The rotating structure includes a cylindrical body that is substantially hollow and open at both ends, and opposing end walls that are circular in shape and aligned with open ends of the cylindrical body. The rotating structure includes a first expandable side wall that extends between the cylindrical body and a first one of the opposing end walls, where the first expandable side wall and the first one of the opposing end walls represents a first gravity chamber, The rotating structure further includes a second expandable side wall that extends between the cylindrical body and a second one of the opposing end walls, where the second expandable side wall and the second one of the opposing end walls represents a second gravity chamber. Center openings in the cylindrical body are coaxially aligned on opposing sides of the cylindrical body along an axis of rotation of the cylindrical body. The rotating structure further includes a first hub member and a second hub member that are permanently affixed to the cylindrical body on the opposing sides of the cylindrical body about the center openings. A first radial seal spans a first gap between the first hub member and the first circular side wall to form an air-tight seal around a circumference of the first circular side wall, and a second radial seal spans a second gap between the second hub member and the second circular side wall to form an air-tight seal around a circumference of the second circular side wall.

In another embodiment, the rotatable attachment members comprise a pair of support bearings. A first one of the support bearings connects the first hub member to the first circular side wall, and a second one of the support bearings connects the second hub member to the second circular side wall.

In another embodiment, the first hub member and the second hub member are saucer-shaped, and each includes a rim, an annular base, and a continuous side wall that has a concave shape as it extends from the rim to the annular base. The rim has a shape that corresponds with an outline of the center openings in the cylindrical body.

In another embodiment, the rim of each of the first hub member and the second hub member is welded around the outline of a center opening in the cylindrical body.

In another embodiment, the habitation module further includes a drive mechanism configured to rotate the rotating structure about the axis in relation to the stationary structure to simulate a gravitational force within the first and second gravity chambers. A ring gear is affixed to an outer cylindrical surface of the annular base of the first hub member, and has teeth that mesh with teeth on the drive mechanism.

In another embodiment, the rotating structure further includes extension rods that guide the opposing end walls when they extend radially from the axis. First extension rods are affixed at a first end to the cylindrical body, and are affixed at a second end to the first one of the opposing end walls. Second extension rods are affixed at a first end to the cylindrical body, and are affixed at a second end to the second one of the opposing end walls. The rotating structure further includes first guide rings and second guide rings that are affixed to the cylindrical body. The first extension rods pass through the first guide rings, and the second extension rods pass through the second guide rings.

In another embodiment, the rotating structure includes launch locks installed in the first guide rings and the second guide rings. The launch locks in the first guide rings are tightened onto the first extension rods to secure the rotating structure in a contracted position. The launch locks in the second guide rings are tightened onto the second extension rods to secure the rotating structure in the contracted position.

In another embodiment, the first end of the first extension rods are attached to the first guide rings to secure the rotating structure in an extended position. The first end of the second extension rods are attached to the second guide rings to secure the rotating structure in the extended position.

In another embodiment, the rotating structure further includes first guide rings that are affixed to the cylindrical body, second guide rings that are affixed to the first one of the opposing end walls, and first extension rods that pass through the first guide rings and the second guide rings. The rotating structure further includes third guide rings that are affixed to the cylindrical body, fourth guide rings that are affixed to the second one of the opposing end walls, and second extension rods that pass through the third guide rings and the fourth guide rings.

In another embodiment, a first end of the first extension rods attach to the first guide rings, and a second end of the second extension rods attach to the second guide rings to secure the rotating structure in an extended position. A first end of the second extension rods attach to the third guide rings, and a second end of the second extension rods attach to the fourth guide rings to secure the rotating structure in the extended position.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
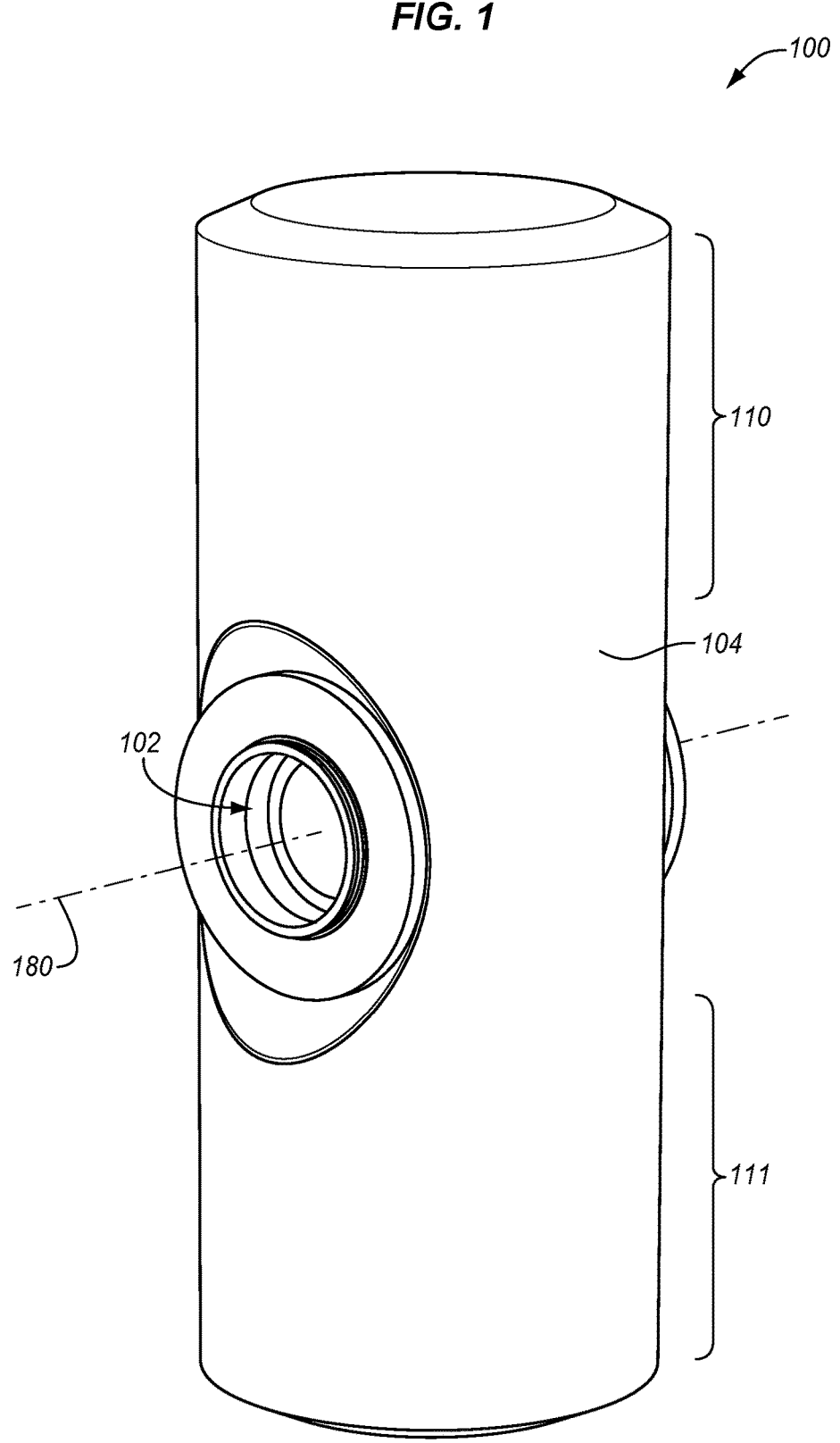
FIG. 1 illustrates a habitation module in an exemplary embodiment.

FIG. 1 illustrates a habitation module 100 in an exemplary embodiment. Habitation module (HAB) 100 is a module used for living quarters for crew members of a space station, such as the International Space Station. For example, HAB 100 may be used for sleeping quarters, restroom facilities, medical facilities, exercise facilities, etc. HAB 100 is configured for space vehicles in Low-Earth Orbit (LEO) or Beyond Low-Earth Orbit (BLEO).

HAB 100 includes a stationary structure 102 and a rotating structure 104 configured to rotate in relation to stationary structure 102 about an axis 180. Rotating structure 104, as described in more detail below, is a unitary body having a cylindrical shape. Each end of rotating structure 104 represents a gravity chamber 110-111 for HAB 100. Gravity chambers 110-111 comprise the pods or compartments of HAB 100 where crew members may experience artificial gravity. Crew members are able to enter the interiors of gravity chambers 110-111. With crew members inside, rotating structure 104 is driven to rotate at a speed about axis 180 to create an artificial gravity environment within gravity chambers 110-111. For example, rotating structure 104 may be driven at 5 rpm, 10 rpm, 12 rpm, etc., to generate simulated gravity, such as in the range of 0.2 G to 1 G. The speed of rotation is adjustable depending on the comfort of the crew members and the desired artificial gravity inside of gravity chambers 110-111.

Figure 2:
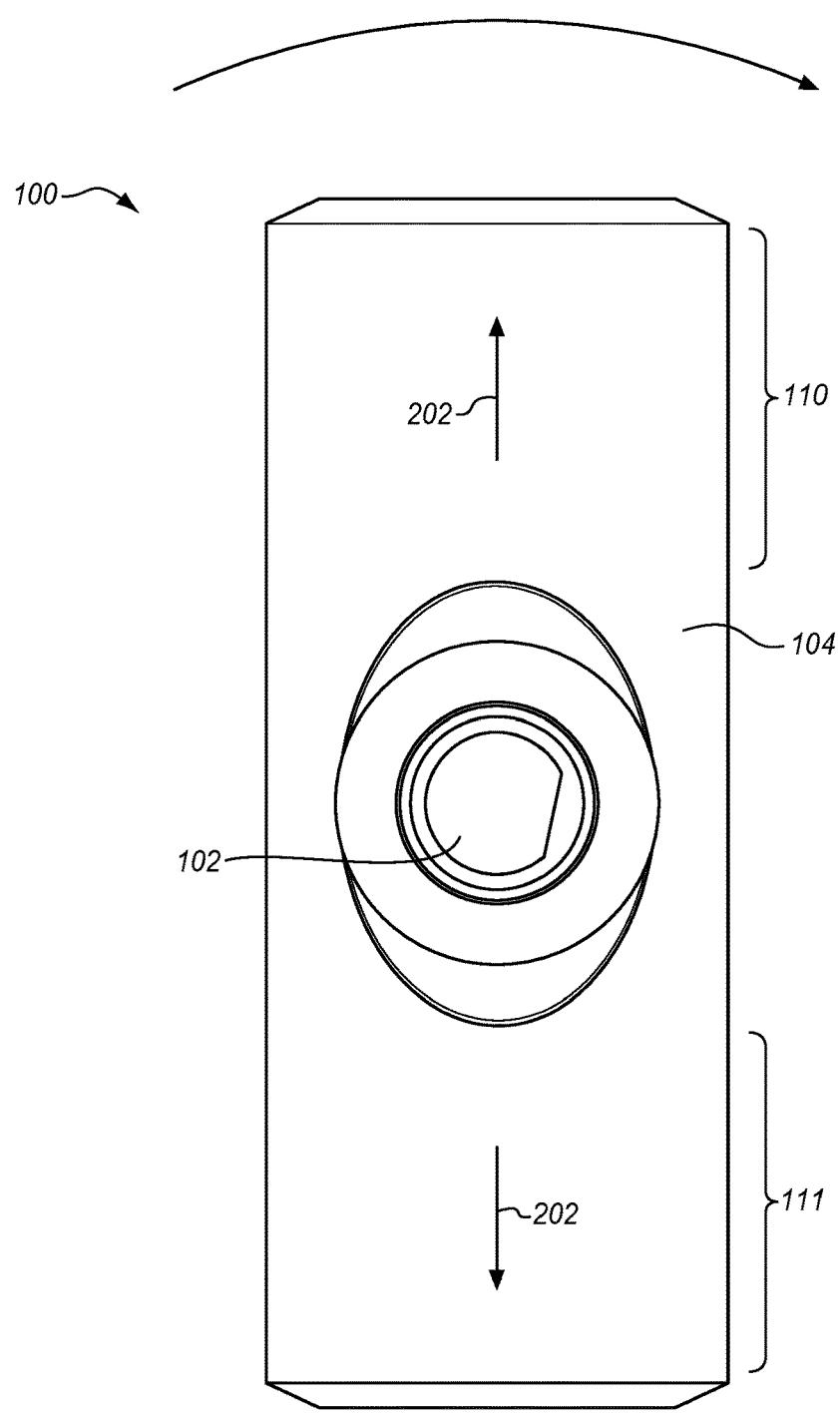
FIG. 2 is a side view of a habitation module in an exemplary embodiment.

FIG. 2 is a side view of HAB 100 in an exemplary embodiment. For the view in FIG. 2, axis 180 from FIG. 1 is into and out of the page. In the embodiments described below, rotating structure 104 is driven to spin in relation to stationary structure 102 about axis 180 (see also FIG. 1). The rotation about axis 180 creates a centrifugal force 202 on objects (e.g., crew members) inside of gravity chambers 110-111. The centrifugal force 202 feels like gravity to crew members inside of gravity chambers 110-111.

Figure 3:
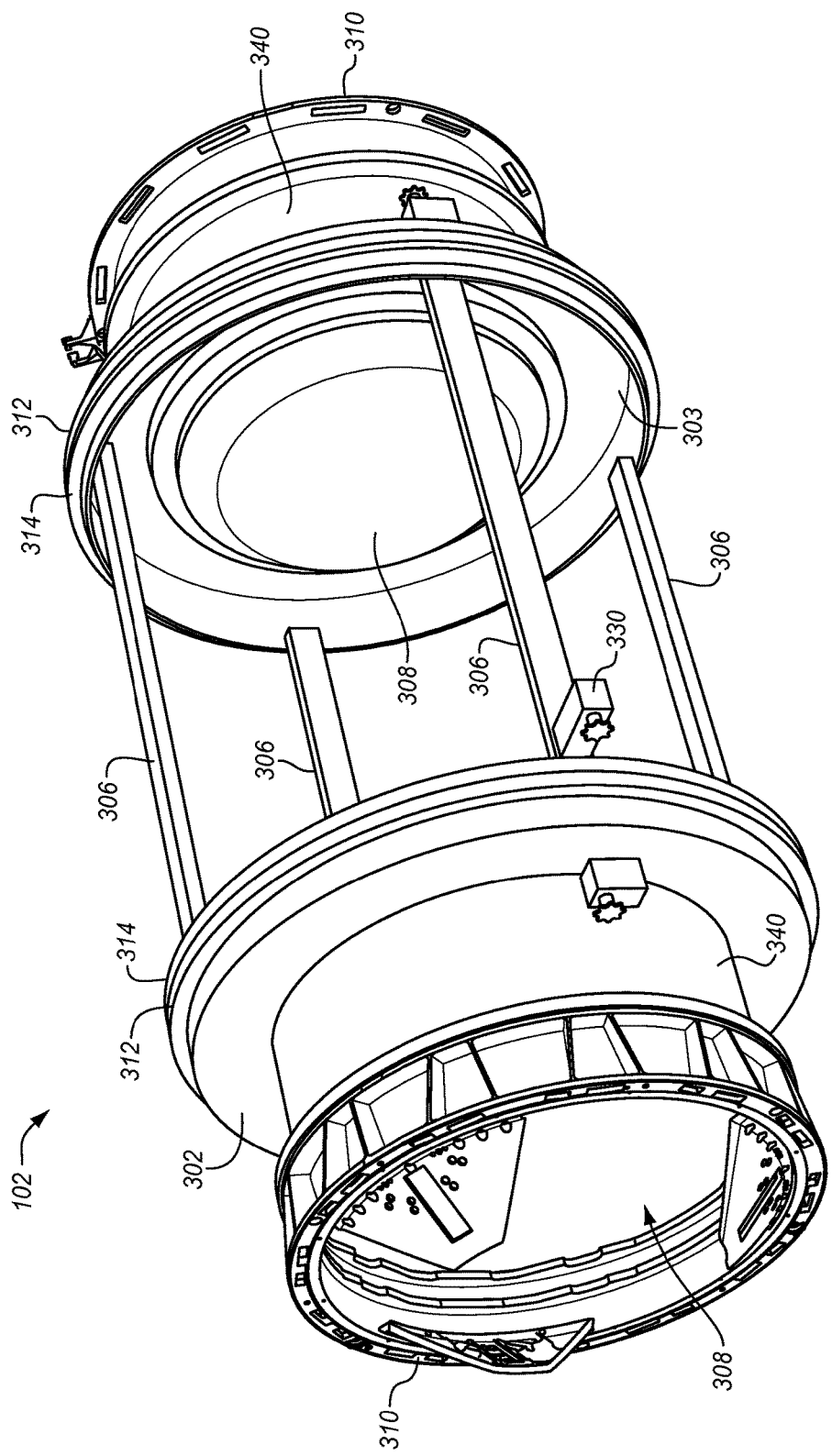
FIGS. 3-4 illustrate a stationary structure of a habitation module in an exemplary embodiment.
Figure 4:
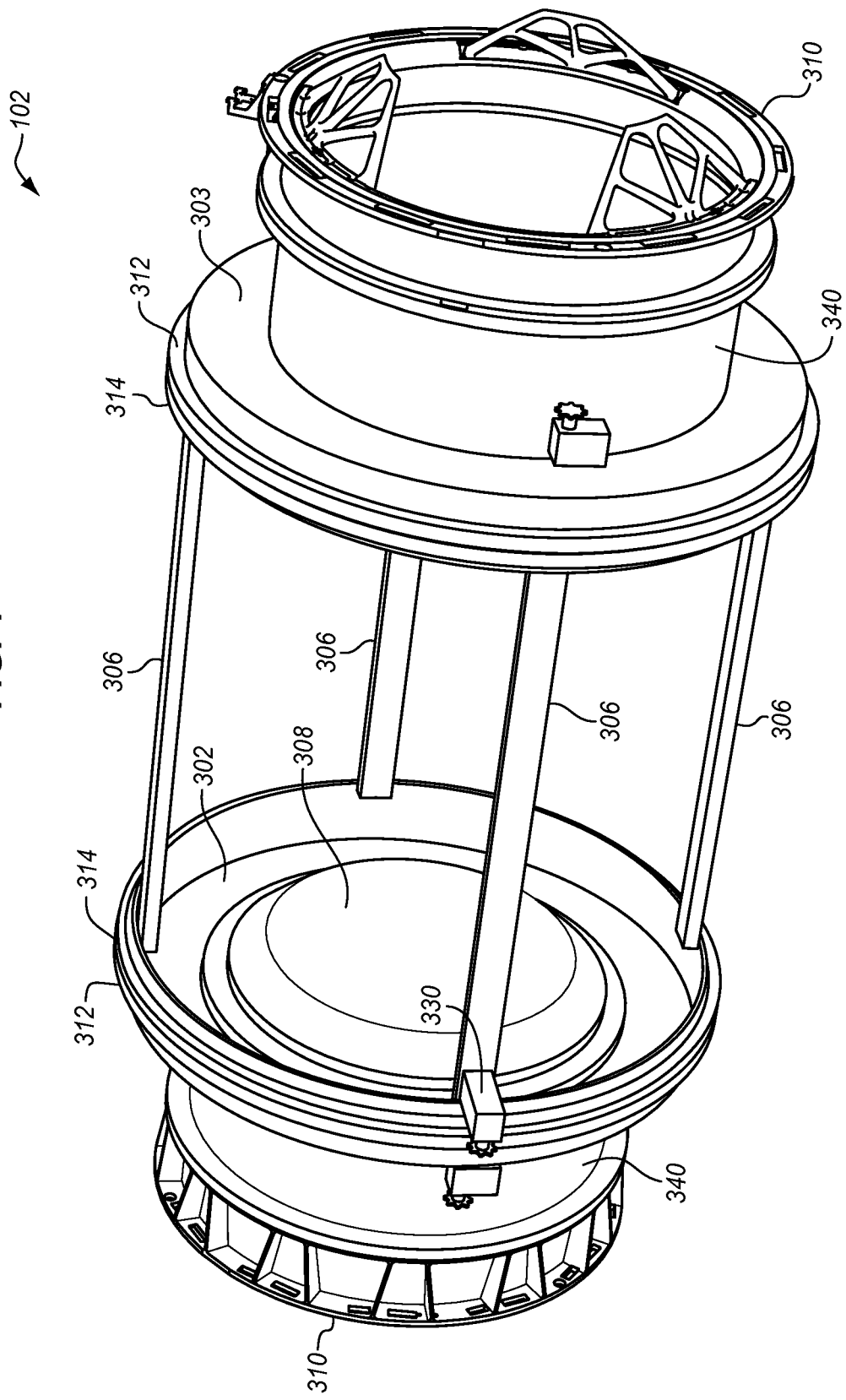

FIGS. 3-4 illustrate stationary structure 102 in an exemplary embodiment. Stationary structure 102 generally has a cylindrical profile so that rotating structure 104 can slide over and onto stationary structure 102 (see FIG. 1). To create the cylindrical profile, stationary structure 102 includes side walls 302-303 connected by one or more support beams 306. Each side wall 302-303 has a circular or disk shape. Both side walls 302-303 include a hatch 308 that is located towards the center of side wall 302-303, and may be opened by a crew member to pass through side wall 302-303. One or both of side walls 302-303 may include an active or passive docking mechanism 310 that encircles hatch 308. A docking mechanism (or berthing mechanism) 310 comprises any mechanism that forms an air-tight or pressure-tight seal between side wall 302-303 and another module, such as a module of a space station. This allows stationary structure 102 to be attached to a space station, and put into operation.

Support beams 306 are members that provide a support structure between side walls 302-303. Side walls 302-303 are spaced apart and aligned co-axially with one another via support beams 306. In the exemplary embodiment shown in FIGS. 3-4, four support beams 306 are attached between side walls 302-303, although more or less support beams 306 may be used in other embodiments. Support beams 306 are connected to regions of side walls 302-303 outside of hatch 308 so as to not interfere with passage of crew members through hatch 308. Although support beams 306 are shown as extending between side walls 302-303 in parallel with the center axis of side walls 302-303 in this embodiment, support beams 306 may extend diagonally between side walls 302-303 in other embodiments.

Figure 5:
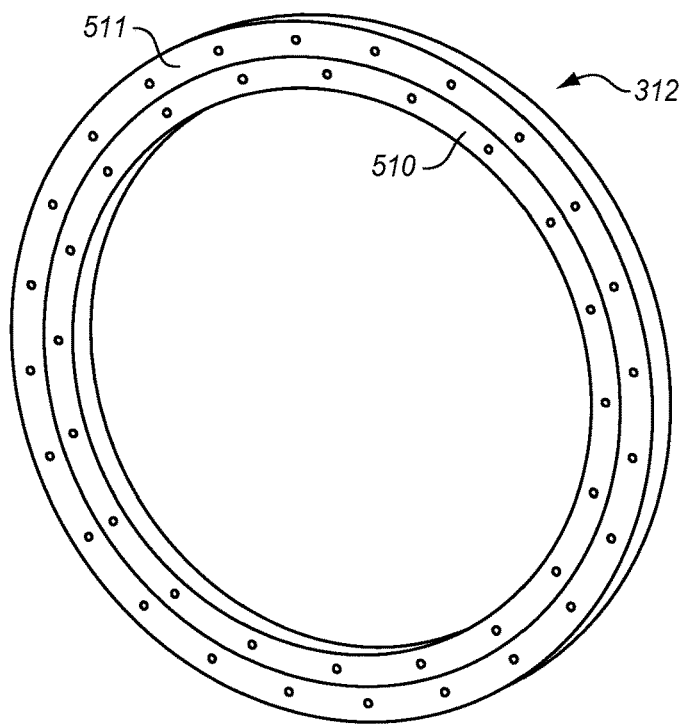
FIG. 5 illustrates a support bearing in an exemplary embodiment.

To allow rotating structure 104 to rotate in relation to stationary structure 102 (see FIG. 1), rotating structure 104 may attach to stationary structure 102 with rotatable attachment members, such as support bearings 312. Support bearings 312 are annular or ring-shaped, and attach around the outer circumference of side walls 302-303. FIG. 5 illustrates a support bearing 312 in an exemplary embodiment. Support bearing 312 includes an inner race (or ring) 510, an outer race (or ring) 511, and a rolling element between inner race 510 and outer race 511 that enables rotational movement (not visible in FIG. 5). The rolling element may comprise ball bearings, cylindrical rollers, or the like. Inner race 510 is configured to attach to a side wall 302-303 of stationary structure 102, while outer race 511 is configured to attach to rotating structure 104.

Figure 6:
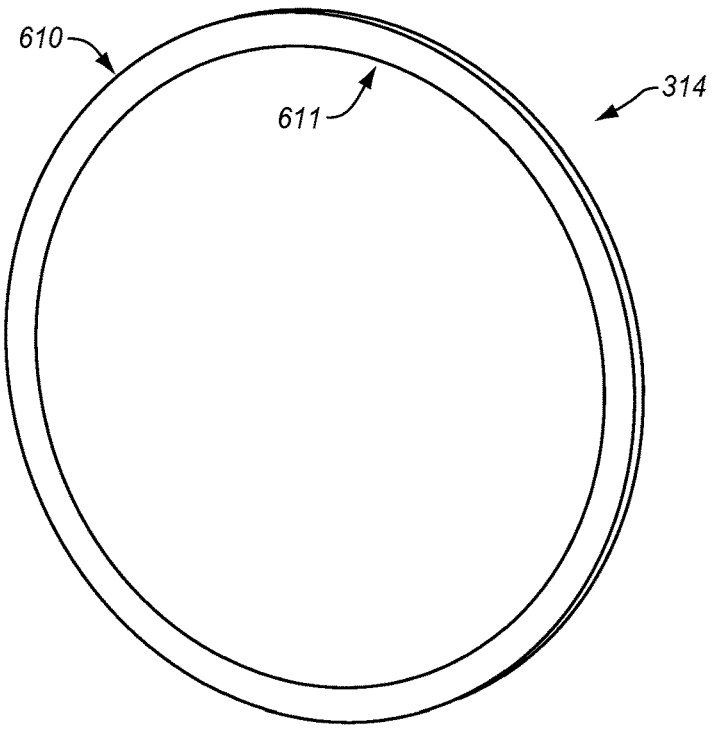
FIG. 6 illustrates a radial seal in an exemplary embodiment.

Although rotating structure 104 is able to rotate in relation to stationary structure 102, the attachment point or juncture between rotating structure 104 and stationary structure 102 is sealed so that the interior of HAB 100 may be pressurized (e.g., to 1 atmosphere). Any gap or seam between rotating structure 104 and stationary structure 102 at their attachment point is sealed with radial seals 314. FIG. 6 illustrates radial seal 314 in an exemplary embodiment. In this embodiment, radial seal 314 is configured to attach around the outer circumference of a side wall 302-303. Radial seal 314 includes an inner surface 611 that is configured to contact a surface of a side wall 302-303, and an outer surface 610 that is configured to contact a surface of rotating structure 104 to form an air-tight or pressure-tight seal. A cross-section of radial seal 314 may have any desired shape, such as rectangular, round, ribbed, etc.

Figure 7:
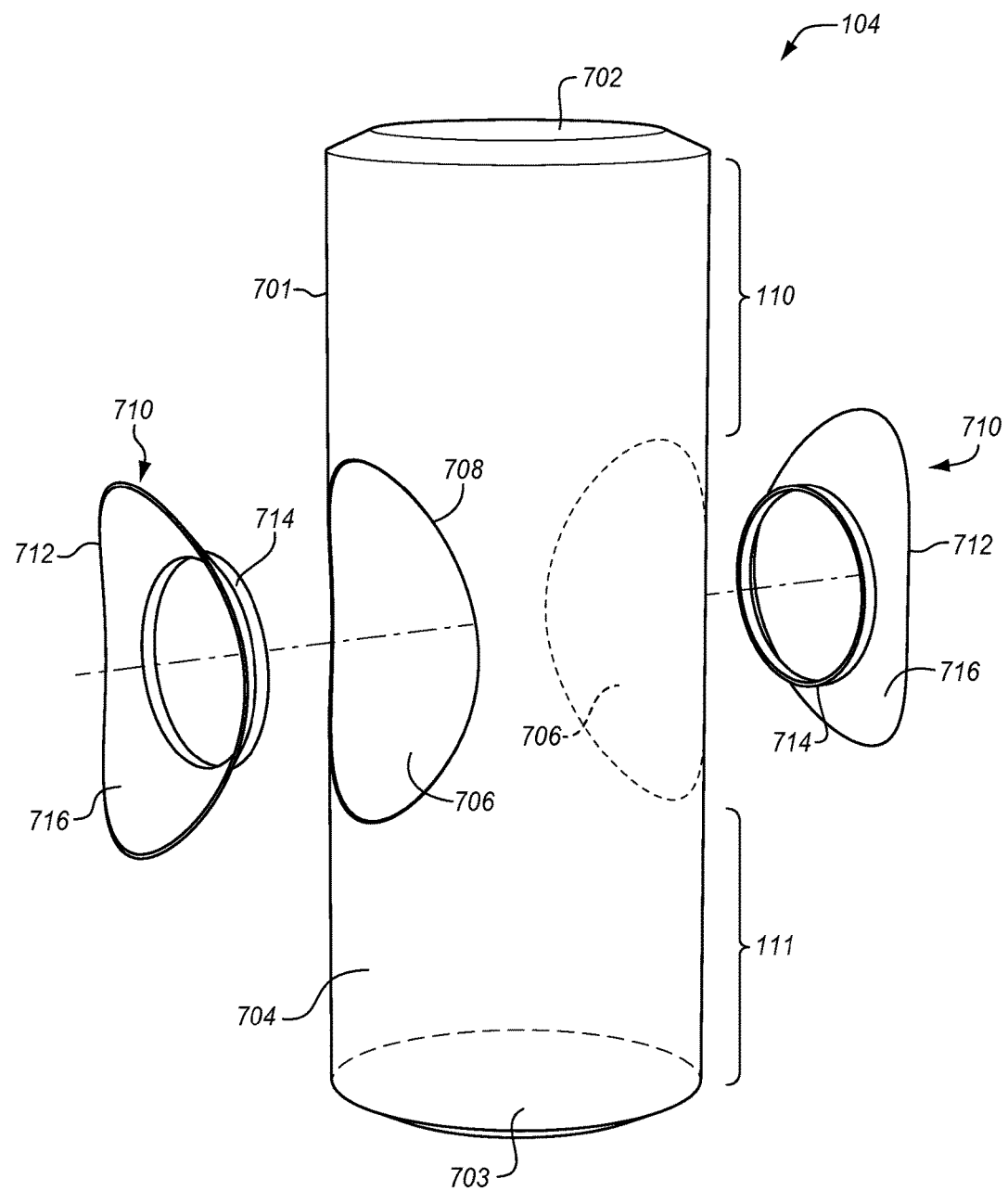
FIG. 7 illustrates a rotating structure of a habitation module in an exemplary embodiment.

FIG. 7 illustrates rotating structure 104 in an exemplary embodiment. Rotating structure 104 includes a cylindrical body 701 that is substantially hollow, and closed at both ends. Cylindrical body 701 includes opposing end walls 702-703 that are circular in shape, and side wall 704 that connects between end walls 702-703. Cylindrical body 701 may be made from a thin metal, a composite material, a plastic, or another type of rigid material. The diameter of cylindrical body 701 may be limited by the size of the launch vehicle used to transport HAB 100 into space. For example, an Atlas rocket from NASA may be used to transport HAB 100 into space, and the diameter of cylindrical body 701 may be constrained by the size of the Atlas rocket to be about 4.3 meters or less. The length of cylindrical body 701 may also be constrained by the size of the launch vehicle to be about 8 meters or less.

Cylindrical body 701 includes center apertures or openings 706 in side wall 704 that are coaxially aligned on opposing sides of cylindrical body 701 to define a cylindrical aperture through the center of cylindrical body 701. Center openings 706 are aligned along an axis of rotation of cylindrical body 701, where the axis of rotation is perpendicular to the long axis of cylindrical body 701. Rotating structure 104 also includes hub members 710 that attach to cylindrical body 701 about center openings 706. Hub members 710 represent the center part of rotating structure 104 which attaches to stationary structure 102. Hub members 710 are saucer-shaped, and include a rim 712, an annular base 714, and a continuous side wall 716 that has a concave shape as it extends from rim 712 to annular base 714. Rim 712 has a shape that corresponds with the outline 708 of center openings 706. The outline 708 of center openings 706 may be circular, oval-shaped, or another desired shape. Rim 712 of each hub member 710 is permanently affixed is to cylindrical body 701. For example, a weld may be used to permanently affix rim 712 of a hub member 710 to cylindrical body 701 around the outline 708 of center opening 706, although other means may be used in other embodiments. Each annular base 714 comprises a circular ring that defines an opening for stationary structure 102. When affixed to cylindrical body 701, the openings defined by annular base 714 are aligned with one another so that rotating structure 104 may slide onto stationary structure 102. Annular base 714 of hub member 710 will then attach to stationary structure 102 through rotatable attachment members, such as support bearings 312.

Each end of cylindrical body 701 represents a gravity chamber 110-111 of HAB 100. In this embodiment, the interior of gravity chambers 110-111 may be hollow or empty to form open quarters for crew members. The interior of gravity chambers 110-111 may include a treadmill, an exercise bike, or any other exercise equipment. The interior of gravity chambers 110-111 may include restroom facilities (e.g., a shower, a toilet, a sink, etc.), office facilities (e.g., a desk, chairs, cabinets, etc.), lounge facilities (e.g., chairs, a couch, etc.), sleeping facilities (e.g., a bed), or any other facilities. Gravity chambers 110-111 may also be compartmentalized into individual rooms.

End wall 702 serves as the floor of gravity chamber 110, and end wall 703 serves as the floor of gravity chamber 111. The interior of end walls 702-703 and side wall 704 may be lined with a rubber, padding, or any other material that protects crew members inside of gravity chambers 110-111. Side wall 704 may include one or more windows, and end walls 702-703 may include an emergency hatch (not shown in FIG. 7).

Figure 8:
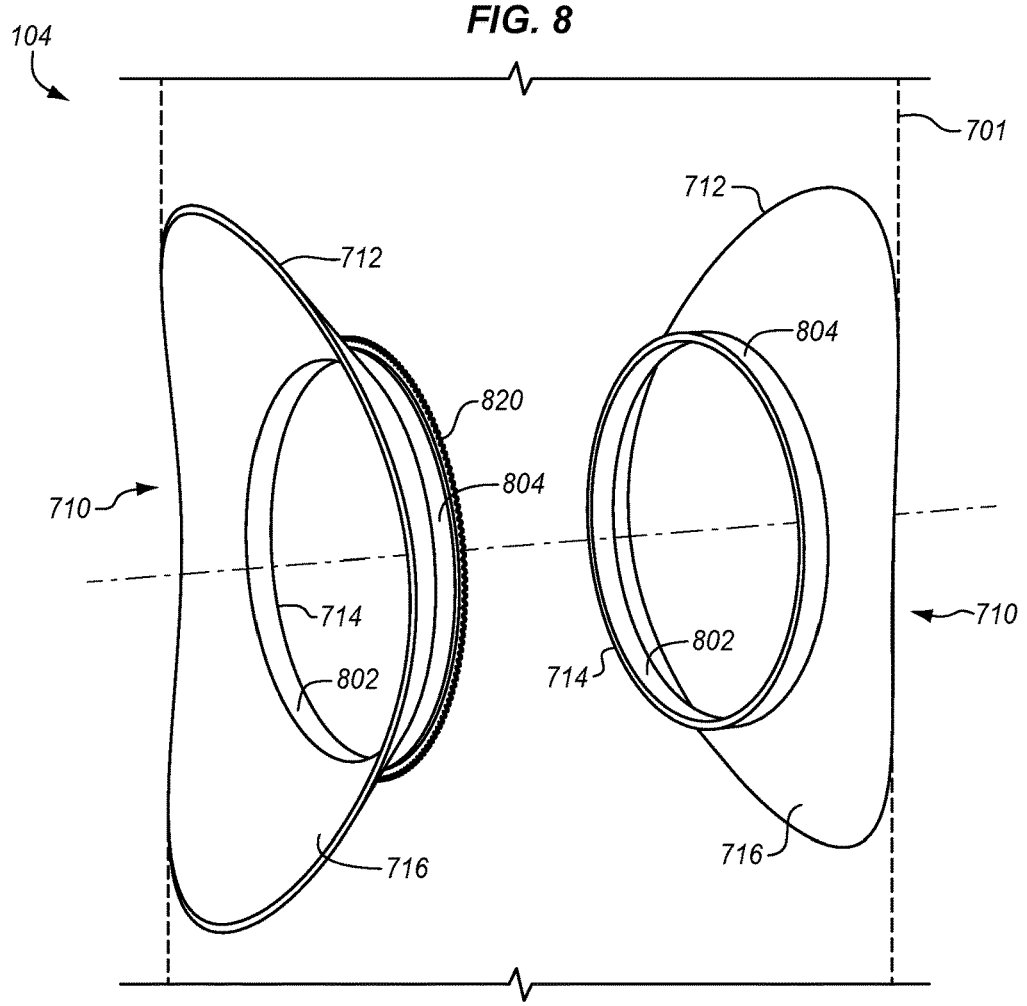
FIG. 8 is a magnified view of a rotating structure of a habitation module in an exemplary embodiment.
Figure 9:
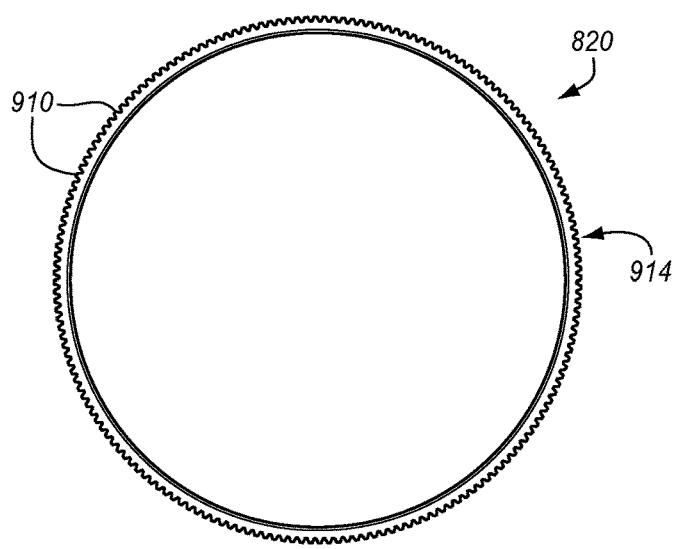
FIG. 9 illustrates a ring gear in an exemplary embodiment.

FIG. 8 is a magnified view of rotating structure 104 in an exemplary embodiment. This view shows the middle portion of rotating structure 104, with hub members 710 affixed to cylindrical body 701. Annular base 714 of hub members 710 has an inner cylindrical surface 802 and an outer cylindrical surface 804. When rotating structure 104 is slid onto stationary structure 102 as shown in FIG. 1, inner cylindrical surface 802 of annular base 714 connects with stationary structure 102 (i.e., side walls 302-303) through rotatable attachment members. To spin rotating structure 104 around stationary structure 102, a ring gear 820 may be affixed to outer cylindrical surface 804 of annular base 714 to mate with a drive mechanism. FIG. 9 illustrates ring gear 820 in an exemplary embodiment. In this embodiment, ring gear 820 includes a plurality of teeth 910 on an outer surface 914 for meshing with a drive gear of a drive mechanism of HAB 100, such as drive mechanism 330 shown in FIGS. 3-4. Ring gear 820 may bolt or otherwise attach to outer cylindrical surface 804 of annular base 714. Although one ring gear 820 is illustrated in FIG. 8, a ring gear 820 may be affixed to each hub member 710 to drive rotating structure 104 from both sides. Drive mechanism 330 (see FIGS. 3-4) is placed proximate or adjacent to ring gear 820, and is configured to spin a drive gear to impart rotational movement to ring gear 820. Teeth on the drive gear of drive mechanism 330 mesh with teeth 910 of ring gear 820. When drive mechanism 330 turns its drive gear, it imparts rotational movement on rotating structure 104 about axis 180 (see FIG. 1). Drive mechanism 330 may comprise an electric motor, a hydraulic motor, a pneumatic motor, or any other actuating device that has a variable rotational speed.

When rotating structure 104 is slid onto stationary structure 102 as shown in FIG. 1 and attached via support bearings 312, radial seals 314 span a gap between hub members 710 and stationary structure 102 to create an air-tight or pressure-tight seal around a circumference of the side walls 302-303 of stationary structure 102. Therefore, the interior of rotating structure 104 may be pressurized. Also, drive mechanism 330 (see FIG. 3) meshes with ring gear 820. Drive mechanism 330 can therefore impart rotation movement to rotating structure 104 about axis 180. Crew members may access gravity chambers 110-111 to experience an artificial gravity environment. As rotating structure 104 rotates about axis 180 (see FIG. 2), the centrifugal force 202 created will pull a crew member towards end walls 702-703, which comprise the floor of gravity chambers 110-111. The amount of force on an object depends on the angular velocity of rotation and the distance of the object from the axis of rotation. Although the dimensions of rotating structure 104 may vary as desired, the distance of end walls 702-703 of rotating structure 104 may be about 4 meters or less from axis 180.

When inside of gravity chamber 110, for example, a crew member will experience the artificial gravity environment created by rotation of rotating structure 104 about axis 180. The force created by rotation of rotating structure 104 about axis 180 pushes the crew member against end wall 702, which feels like gravity. That way, the crew member may sleep, exercise, etc., within gravity chamber 110 in an artificial gravity environment, which has health benefits such as reduced muscle and bone degeneration. Also, when in use, the interior of rotating structure 104 is pressurized and temperature-controlled so that a crew member does not need to wear a specialize suit. Even though rotating structure 104 rotates in relation to stationary structure 102, the attachment points between rotating structure 104 and stationary structure 102 are sealed so that an oxygen-supplied and thermally-controlled environment is created within the interior of rotating structure 104. The pressurized and thermally-controlled environment is also advantageous as drive unit 330 is readily accessible for replacement or repair, and bearings 312 and seals 314 are accessible for service.

Figure 10:
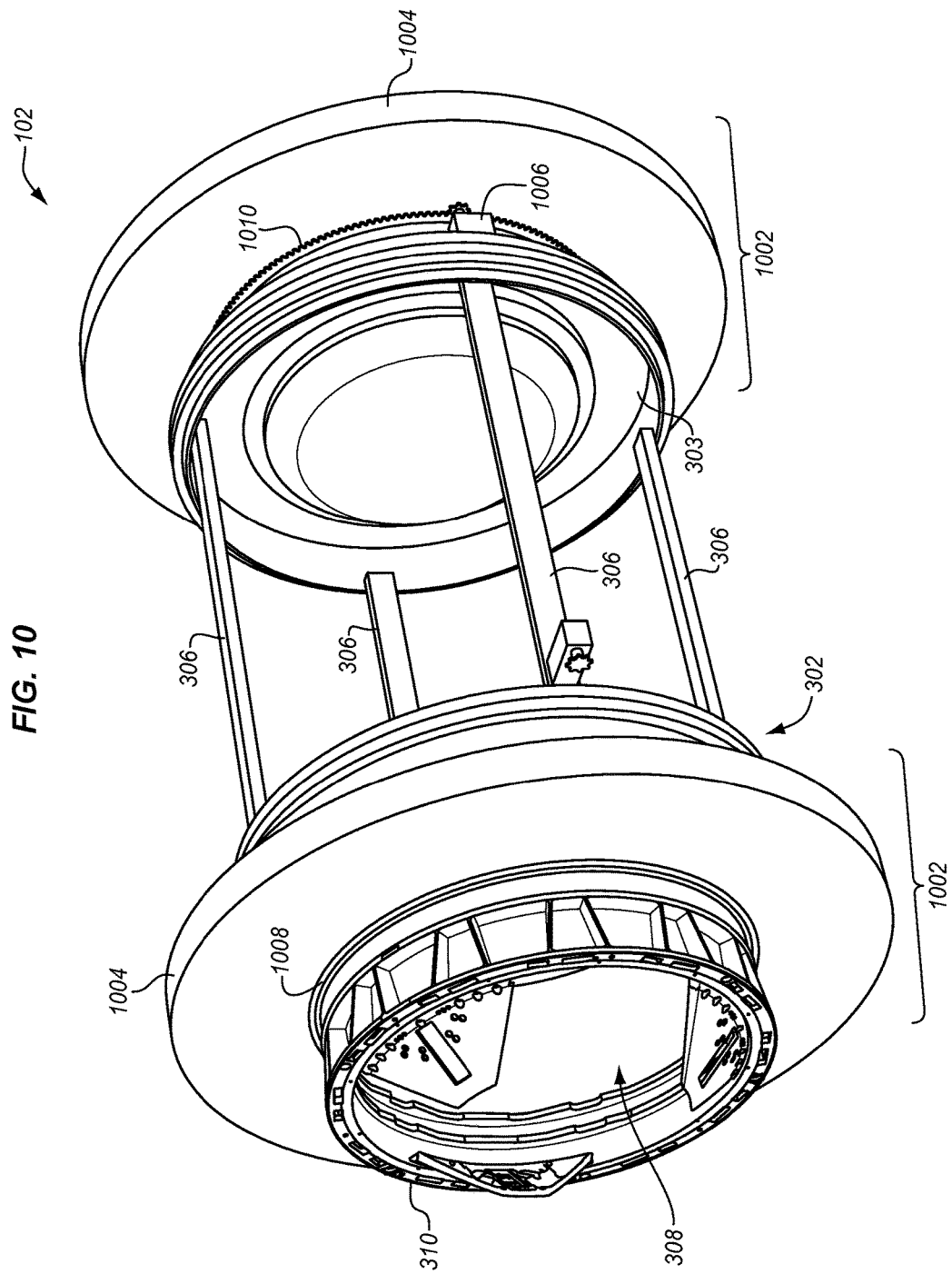
FIG. 10 illustrates a counter-rotating mechanism in an exemplary embodiment.

The rotation of rotating structure 104 may create an unwanted momentum for HAB 100. To cancel out the unwanted momentum, a counter-rotating mechanism may be installed to rotate about axis 180 in an opposite direction than rotating structure 104. FIG. 10 illustrates a counter-rotating mechanism 1002 in an exemplary embodiment. Counter-rotating mechanism 1002 is installed on stationary structure 102. In this embodiment, counter-rotating mechanism 1002 includes a counter-weight 1004 that is an annular ring having a diameter greater than the diameter of hatch 308. Counter-weight 1004 does not have to be a continuous structure as shown in FIG. 10, but may be segmented and spaced around the circumference of hatch 308. Counter-weight 1004 is driven by a drive mechanism 1006 to rotate in the opposite direction of rotating structure 104 about axis 180 to negate momentum created by rotation of rotating structure 104. Counter-rotating mechanism 1002 may be installed on both sides of stationary structure 102. On either side of stationary structure 102, counter-weight 1004 may be attached to an outer cylindrical surface 340 (see FIG. 3) of hatch 308 via a support bearing 1008. Support bearings 1008 may be ring-shaped as described above for support bearings 312.

Support bearings 1008 also include teeth 1010 that mesh with a drive gear of drive mechanism 1006 so that drive mechanism 1006 can impart rotational movement to counter-weight 1004 in an opposite direction than rotating structure 104. Momentum is measured in mass multiplied by velocity (rotational). If it is assumed that the mass of counter-weight 1004 is fixed, then counter-weight 1004 is driven at a speed to compensate for the momentum created by rotation of rotating structure 104. If the mass of rotating structure 104 changes (e.g., crew members enter one of gravity chambers 110-111), then drive mechanism 1006 adjusts the rotational speed of counter-weight 1004 to compensate for the change in mass. The rotational speed of counter-weight 1004 is therefore adjusted so that there is a net-zero momentum change due to rotation of rotating structure 104.

Figure 11:
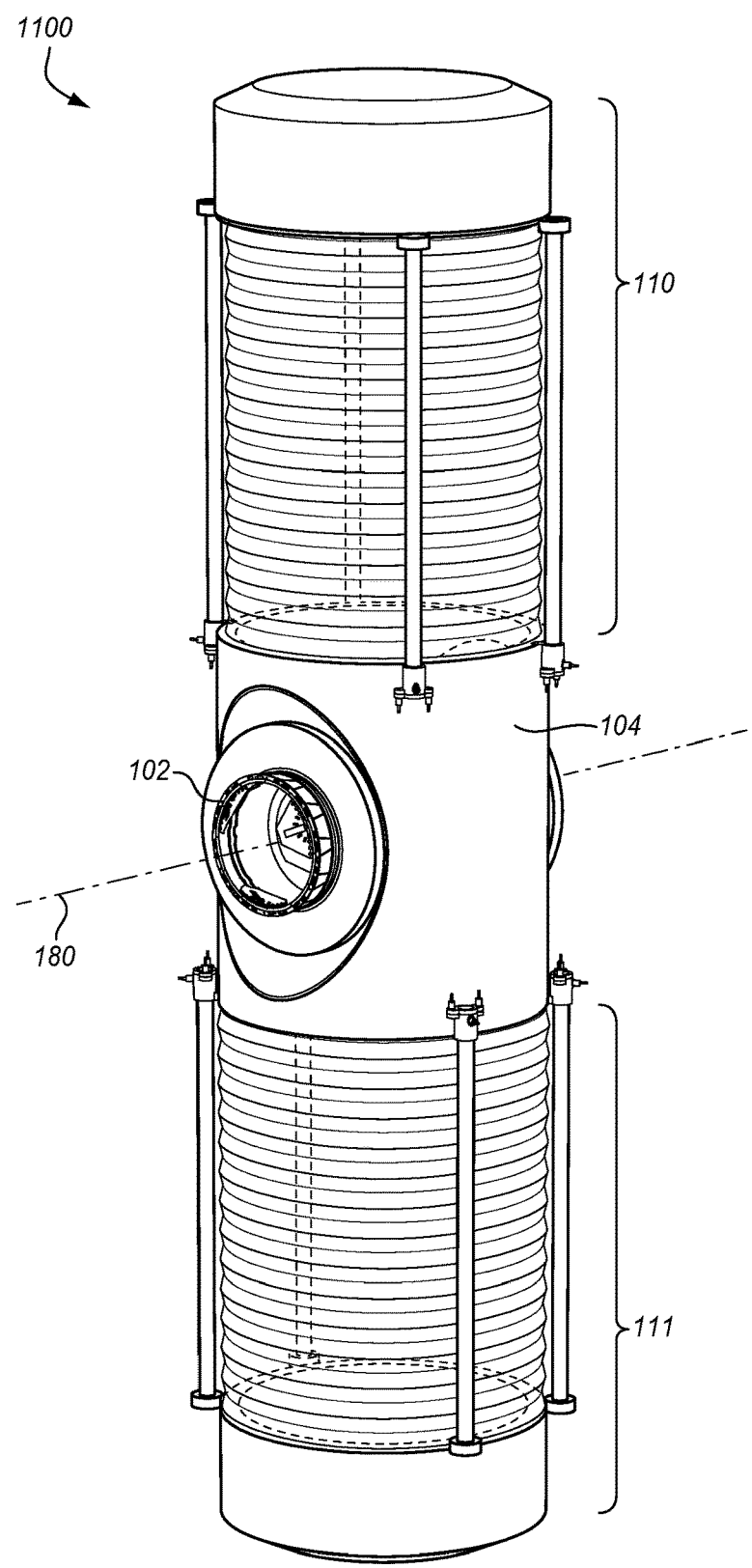
FIG. 11 illustrates another habitation module in an exemplary embodiment.

FIG. 11 illustrates another HAB 1100 in an exemplary embodiment. HAB 1100 is similar to HAB 100 with a stationary structure 102 and a rotating structure 104. Stationary structure 102 is similar to that as described above. Rotating structure 104 is again a unitary body having a cylindrical shape or profile, but is extendable in a radial direction to the axis 180 of rotation. This allows for the rotational radius of rotating structure 104 to be changed when HAB 1100 is put into service in space.

Figure 12:
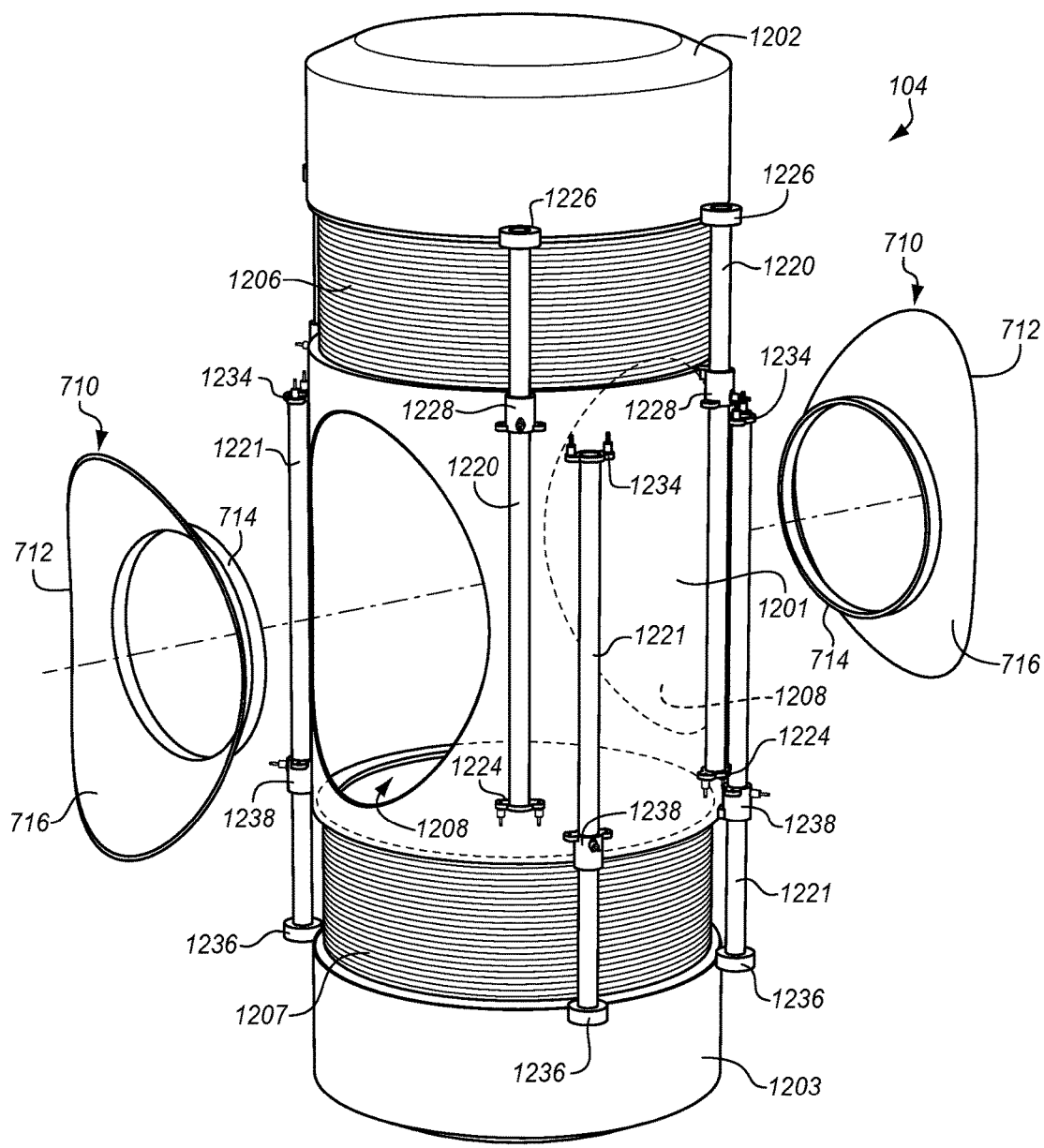
FIG. 12 illustrates a rotating structure of a habitation module in an exemplary embodiment.

FIG. 12 illustrates rotating structure 104 of HAB 1100 in an exemplary embodiment. Rotating structure 104 includes a cylindrical body 1201 that is substantially hollow and open at both ends. Cylindrical body 1201 includes a pair of center apertures or openings 1208 that are coaxially aligned on opposing sides of cylindrical body 1201 to define a cylindrical aperture through the center of cylindrical body 1201. Center openings 1208 are aligned along an axis of rotation of cylindrical body 1201, where the axis of rotation is perpendicular to the long axis of cylindrical body 1201. Rotating structure 104 also includes hub members 710 that attach to cylindrical body 1201 about center openings 1208. Hub members 710 are as described above, and rim 712 of each hub member 710 is permanently affixed is to cylindrical body 1201.

Rotating structure 104 also includes opposing end walls 1202-1203 that are aligned with the open ends of cylindrical body 1201. End walls 1202-1203 may be circular, disk-shaped, cup-shaped, etc. Cylindrical body 1201 and end walls 1202-1203 may be made from a thin metal, a composite material, a plastic, or another type of rigid material. The diameter of cylindrical body 1201 and end walls 1202-1203 and may be limited by the size of the launch vehicle used to transport HAB 1100 into space, much as described above.

Rotating structure 104 also includes an expandable side wall 1206 that extends between end wall 1202 and cylindrical body 1201. Expandable side wall 1206 is made from a material that expands or inflates to increase the distance between end wall 1206 and cylindrical body 1201. Expandable side wall 1206 may be made from a folded canvas/plastic, or any other type of material. Expandable side wall 1206 is sealed around a circumference of end wall 1202 and a circumference of cylindrical body 1201 to form an airtight cavity. Rotating structure 104 also includes an expandable side wall 1207 that extends between end wall 1203 and cylindrical body 1201. Expandable side wall 1207 is sealed around a circumference of end wall 1203 and a circumference of cylindrical body 1201 to form an airtight cavity. When in space, rotating structure 104 may be filled with air or gas so that expandable side walls 1206-1207 become distended. End wall 1202 and expandable side wall 1206 represents gravity chamber 110, and end wall 1203 and expandable side wall 1207 represents gravity chamber 111.

Rotating structure 104 also includes extension rods 1220-1221. Extension rods 1220-1221 are configured to guide end walls 1202-1203 when they extend radially from axis 180. One end 1224 of extension rods 1220 is affixed to cylindrical body 1201 (via a weld, bolts, etc.), and the other end 1226 of extension rods 1220 is affixed to end wall 1202. Extension rods 1220 pass through guide rings 1228, which are affixed to cylindrical body 1201. One end 1234 of extension rods 1221 is affixed to cylindrical body 1201 (via a weld, bolts, etc.), and the other end 1236 of extension rods 1221 is affixed to end wall 1203. Extension rods 1221 pass through guide rings 1238, which are affixed to cylindrical body 1201.

Figure 13:
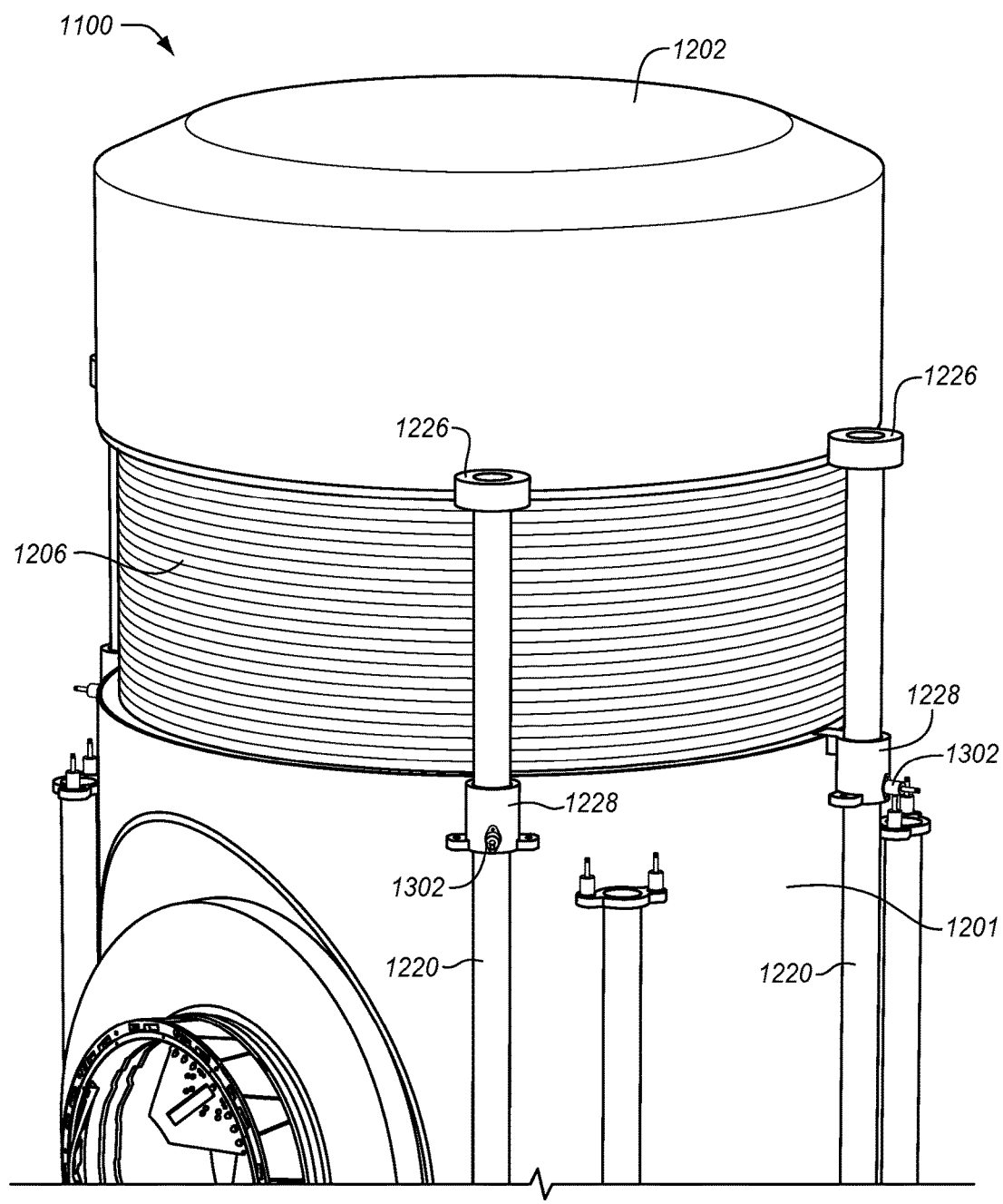
FIG. 13 is a magnified view of a rotating structure in a contracted position in an exemplary embodiment.

FIG. 13 is a magnified view of HAB 1100 in an exemplary embodiment. HAB 1100 is in a contracted position in FIG. 13, which may be used when HAB 1100 is loaded into a launch vehicle and transported into space. To secure HAB 1100 in a contracted position, launch locks 1302 are installed in guide rings 1228. Launch locks 1302 may be tightened onto extension rods 1220 to stop extension rods 1220 from sliding within guide rings 1228.

Figure 14:
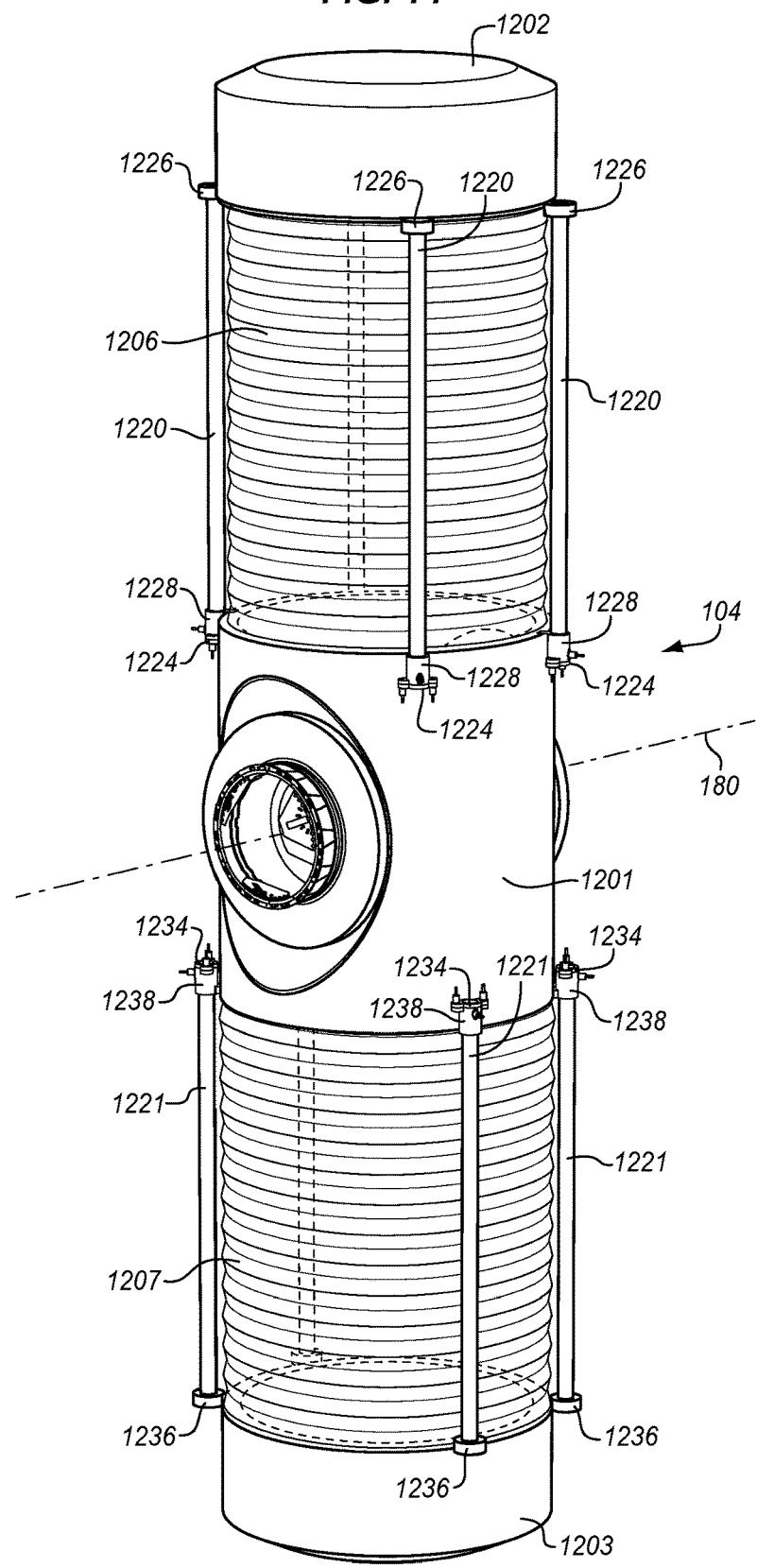
FIG. 14 illustrates a habitation module with a rotating structure in an extended position in an exemplary embodiment.

After HAB 1100 is transported to space, launch locks 1302 are released and rotating structure 104 may be converted from the contracted position to an extended position. FIG. 14 illustrates HAB 1100 in an extended position in an exemplary embodiment. End wall 1202 is extended radially by extension rods 1220, which expands expandable side wall 1206. End wall 1202 may be extended and raised by pressure (inflation), by a mechanical device, etc. When extended, end 1224 of extension rods 1220 may be attached or connected to guide ring 1228 to secure rotating structure 104 in the extended position. Likewise, end wall 1203 is extended radially by extension rods 1221, which expands expandable side wall 1207. When extended, end 1234 of extension rods 1221 may be attached or connected to guide ring 1238 to secure rotating structure 104 in the extended position. Extension of end walls 1202-1203 increases the rotational radius of rotating structure 104. For example, rotating structure 104 may be extended to have a rotational radius between about 7-10 meters.

Figure 15:
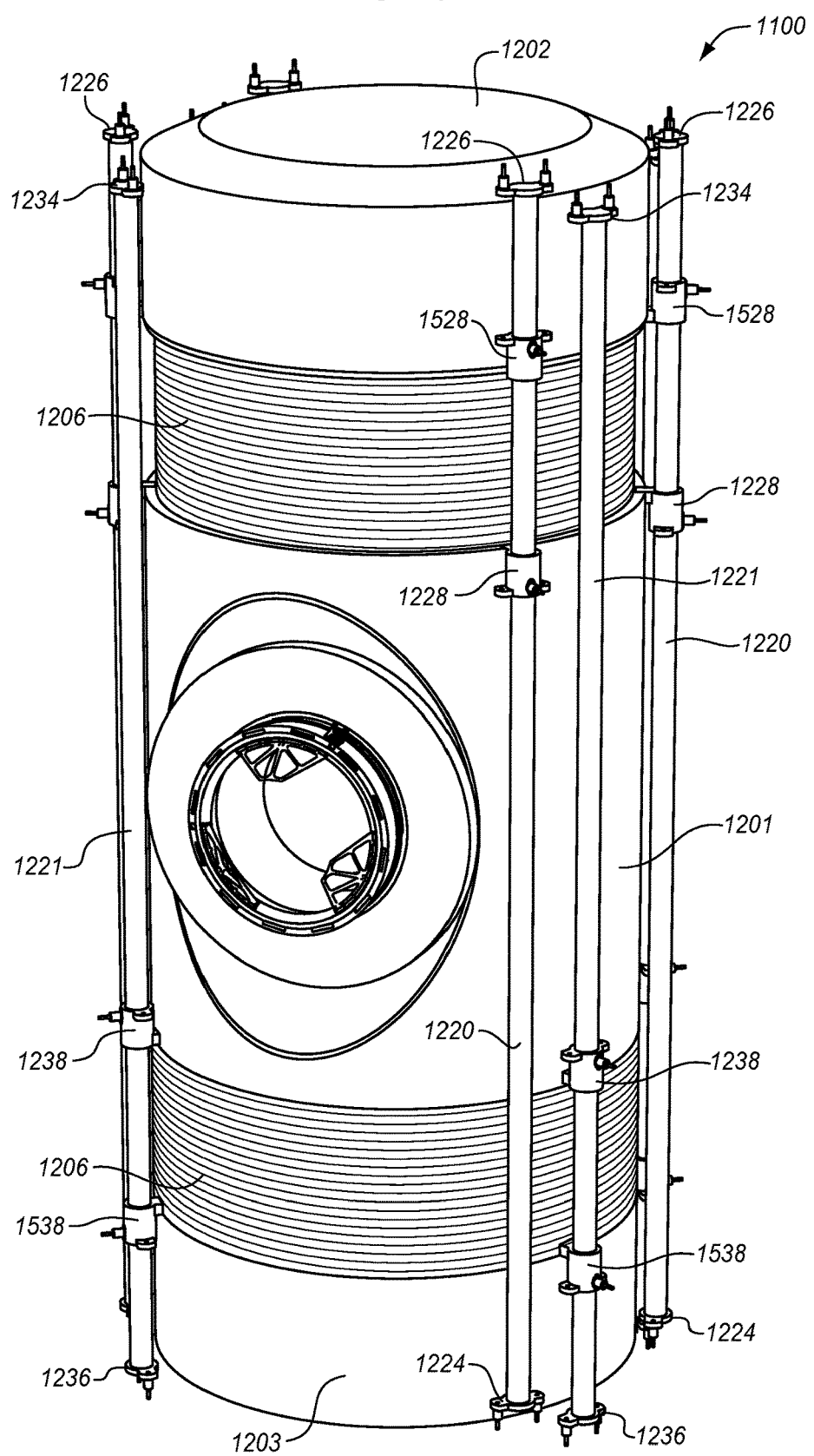
FIG. 15 illustrates a habitation module in a contracted position in an exemplary embodiment.
Figure 16:
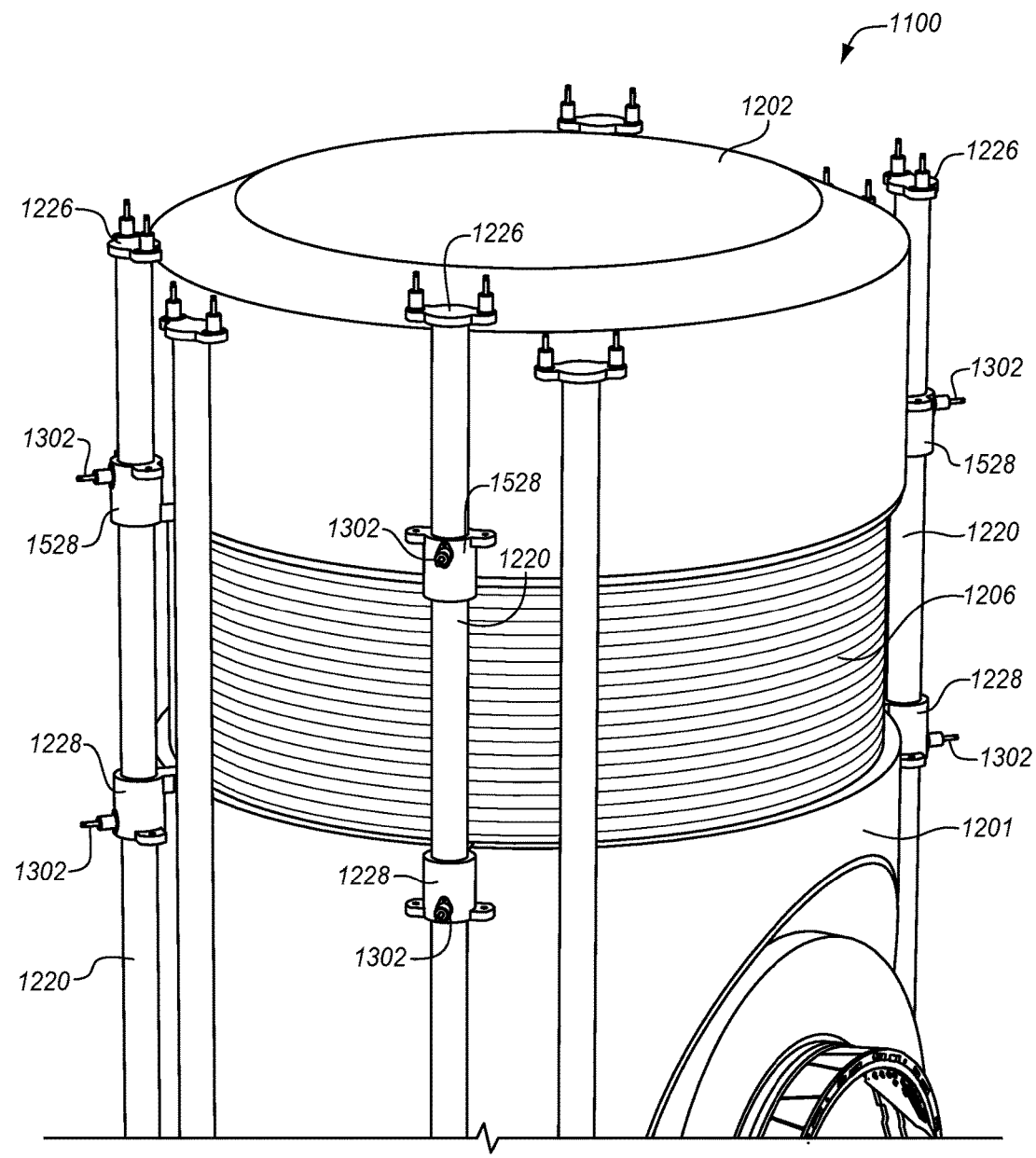
FIG. 16 is a magnified view of a habitation module in a contracted position in an exemplary embodiment.
Figure 17:
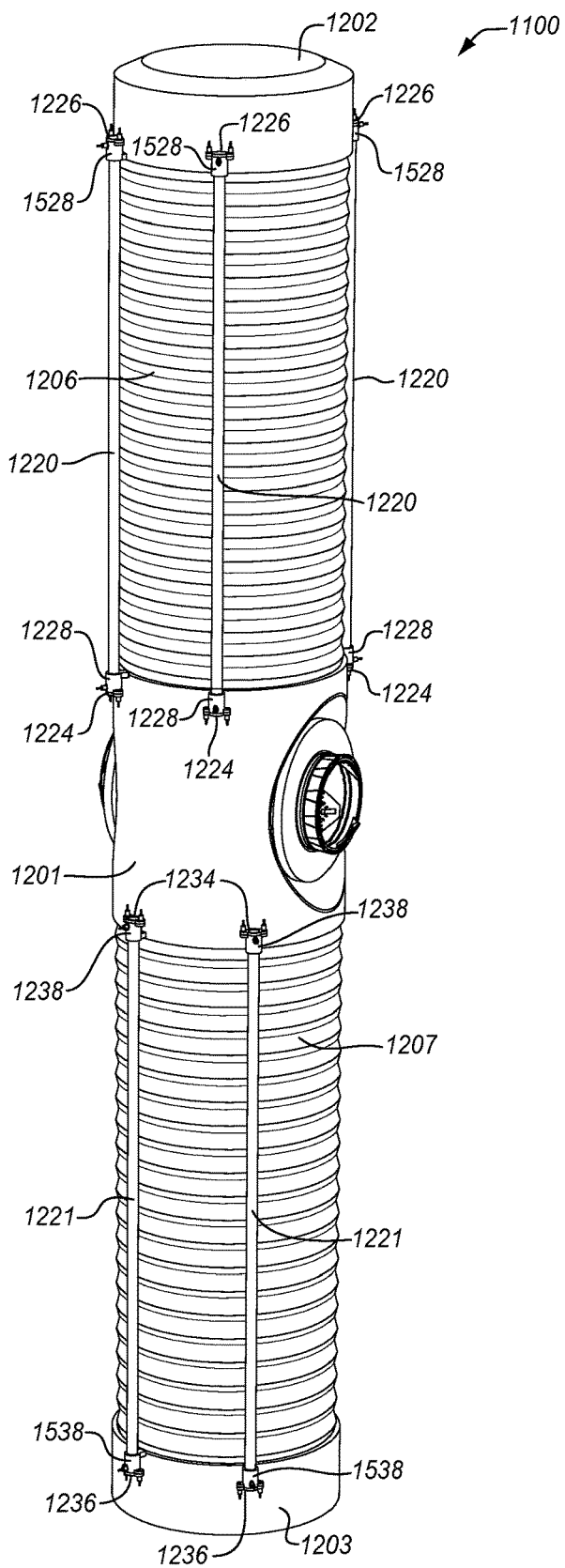
FIG. 17 illustrates a habitation module in an extended position in an exemplary embodiment.

The structure of the extension rods 1220-1221 in HAB 1100 as shown in FIGS. 11-14 illustrates one embodiment, but the extension rods may have different structures to provide support to end walls 1202-1203 as they are extended in the radial direction. FIGS. 15-17 illustrate HAB 1100 with a different structure for extension rods 1220-1221.

FIG. 15 illustrates HAB 1100 in a contracted position in an exemplary embodiment. In this embodiment, extension rods 1220-1221 are not directly affixed to cylindrical body 1201 or end walls 1202-1203. Instead, another guide ring 1528 is affixed to end wall 1202 that is aligned with guide ring 1228 that is affixed to cylindrical body 1201. Extension rods 1220 pass through both guide rings 1228 and 1528 as shown in FIG. 15. FIG. 16 is a magnified view of HAB 1100 in a contracted position in an exemplary embodiment. Neither end of extension rods 1220 is affixed to cylindrical body 1201 or to end wall 1202. Instead, guide rings 1228 are affixed to cylindrical body 1201, and guide rings 1528 are affixed to end wall 1202. Extension rods 1220 pass through both guide rings 1228 and guide rings 1528, and the ends 1224 and 1226 of extension rods 1220 may be detached from another other structural element when HAB 1100 is in the contracted position. To secure HAB 1100 in a contracted position, launch locks 1302 are installed in guide rings 1228 and 1528. Launch locks 1302 may be tightened onto extension rods 1220 to stop extension rods 1220 from sliding within guide rings 1228 and 1528.

After HAB 1100 is transported to space, launch locks 1302 are released and rotating structure 104 may be converted from the contracted position to an extended position. FIG. 17 illustrates HAB 1100 in an extended position in an exemplary embodiment. End wall 1202 is extended radially by extension rods 1220, which expands expandable side wall 1206. End wall 1202 may be extended and raised by pressure (inflation), by a mechanical device, etc. When extended, end 1224 of extension rods 1220 may be attached or connected to guide ring 1228, and end 1226 of extension rods 1220 may be attached or connected to guide ring 1528. Likewise, end wall 1203 is extended radially by extension rods 1221, which expands expandable side wall 1207. When extended, end 1234 of extension rods 1221 may be attached or connected to guide ring 1238, and end 1226 of extension rods 1221 may be attached or connected to guide ring 1538. Extension of end walls 1202-1203 increases the rotational radius of rotating structure 104. For example, rotating structure 104 may be extended to have a rotational radius of about 10.6 meters.

Figure 18:
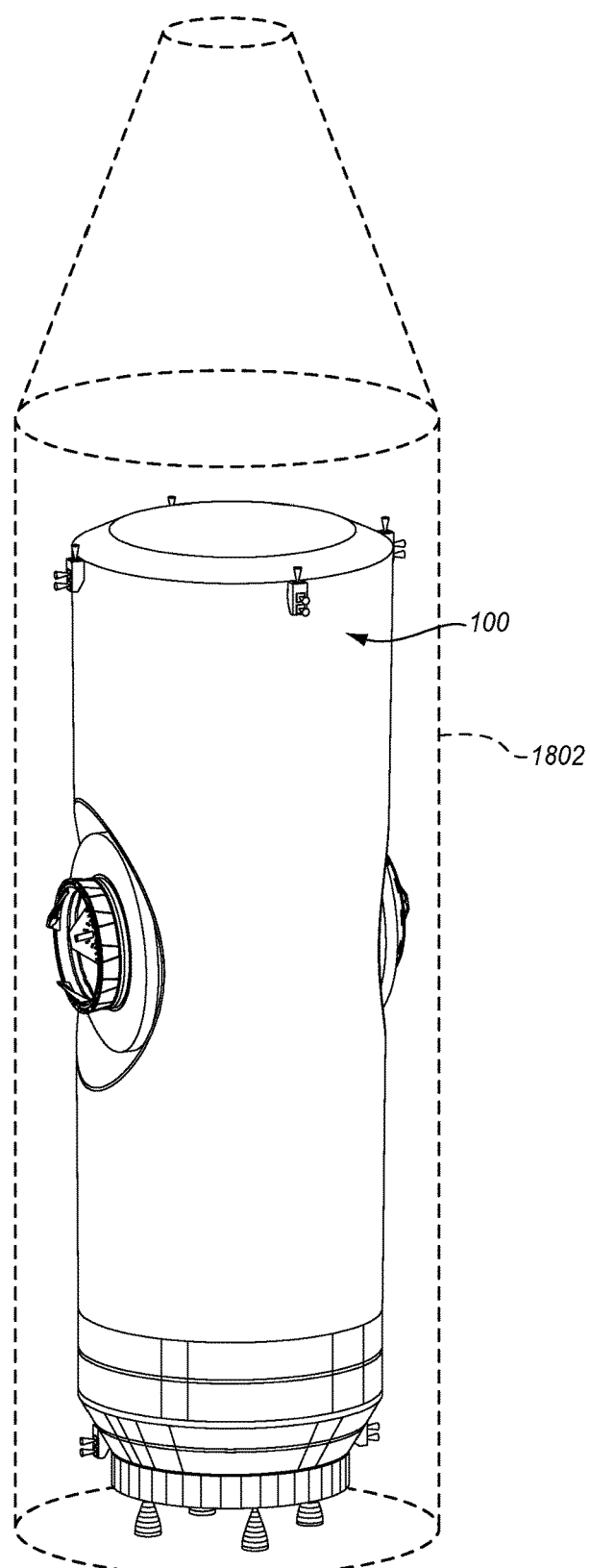
FIGS. 18-19 illustrate habitation modules loaded into launch vehicles in an exemplary embodiment.
Figure 19:
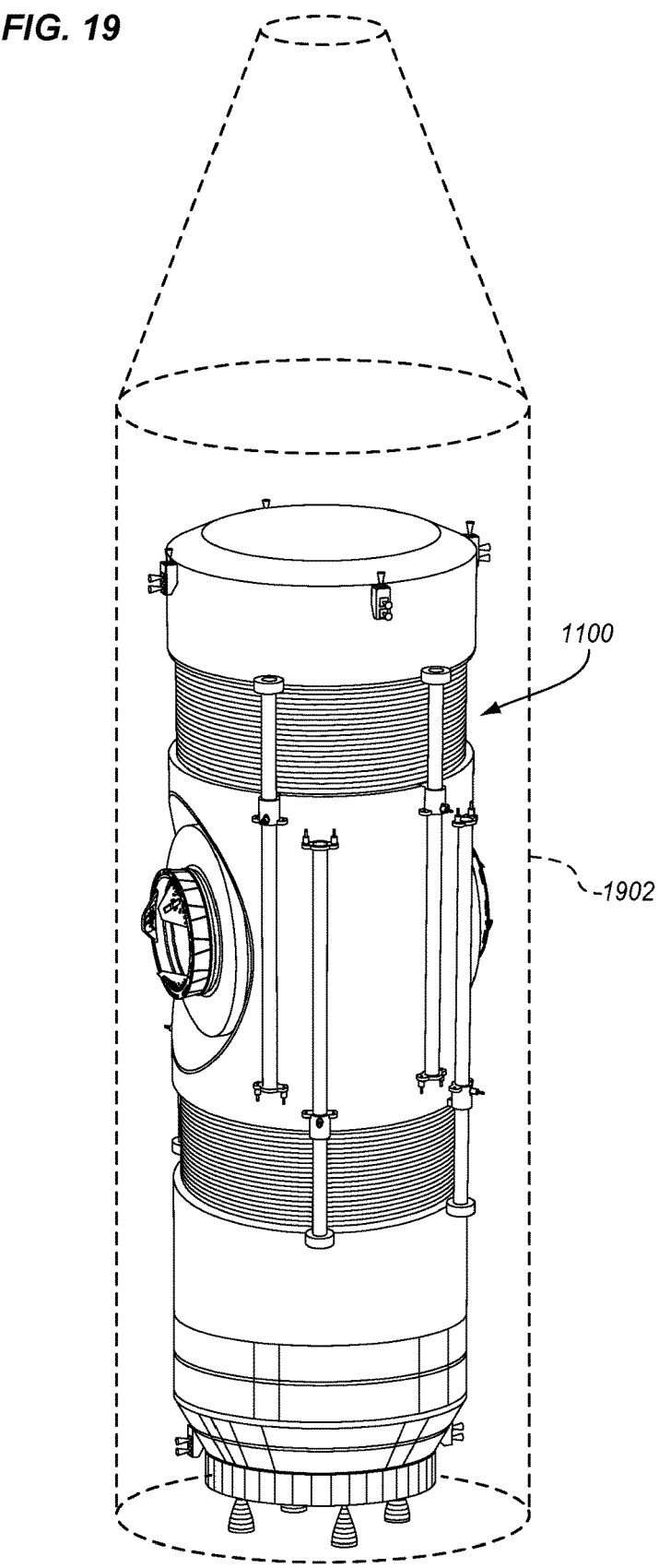

HABs 100 and 1100 are each one-piece units that may be assembled on Earth and transported into space as a complete unit. Traditional HABs are often times modular, and are transported into space in pieces and assembled at the space station. HABs 100 and 1100 are advantageous in that they do not need to be assembled in space, and can be transported as a complete unit. FIGS. 18-19 illustrate HABs 100 and 1100 loaded into launch vehicles 1802 and 1902 in an exemplary embodiment. The launch vehicles 1802 and 1902 are Atlas rockets in this embodiment. Even though HABs 100 and 1100 are one-piece units, they are able to fit in the cargo hold of launch vehicles 1802 and 1902 as complete units. The size of HABs 100 and 1100 may be constrained by the size of the cargo hold of launch vehicles 1802 and 1902. HAB 1100, in particular, is advantageous in that it is extendable, and can operate at a larger rotation radius when separated from launch vehicle 1902. Thus, the operational size of HAB 1100 is not constrained by the size of the cargo hold of launch vehicle 1902.

Although specific embodiments were described herein, the scope is not limited to those specific embodiments. Rather, the scope is defined by the following claims and any equivalents thereof.

What is claimed is:
1. A habitation module comprising:
a stationary structure that includes:
  a first circular side wall;
  a second circular side wall spaced apart from the first circular side wall and aligned axially; and
  at least one support beam that attaches the first circular side wall and the second circular side wall; and
a rotating structure that attaches to the stationary structure through rotatable attachment members, and rotates about an axis in relation to the stationary structure, wherein the rotating structure includes:
  a cylindrical body that is substantially hollow and closed at both ends, wherein each end of the cylindrical body represents a gravity chamber of the habitation module;
  center openings in the cylindrical body that are coaxially aligned on opposing sides of the cylindrical body along an axis of rotation of the cylindrical body; and
  a first hub member and a second hub member that are permanently affixed to the cylindrical body on the opposing sides of the cylindrical body about the center openings;
a first radial seal that spans a first gap between the first hub member and the first circular side wall to form an air-tight seal around a circumference of the first circular side wall; and
a second radial seal that spans a second gap between the second hub member and the second circular side wall to form an air-tight seal around a circumference of the second circular side wall.

2. The habitation module of claim 1 wherein:
the rotatable attachment members comprise a pair of support bearings;
a first one of the support bearings connects the first hub member to the first circular side wall; and
a second one of the support bearings connects the second hub member to the second circular side wall.

3. The habitation module of claim 1 wherein:
the first hub member and the second hub member are saucer-shaped, and each includes:
  a rim;
  an annular base; and
  a continuous side wall that has a concave shape as it extends from the rim to the annular base;
  wherein the rim has a shape that corresponds with an outline of the center openings in the cylindrical body.

4. The habitation module of claim 3 wherein:
the rim of each of the first hub member and the second hub member is welded around the outline of a center opening in the cylindrical body.

5. The habitation module of claim 3 further comprising:
a drive mechanism configured to rotate the rotating structure about the axis in relation to the stationary structure to simulate a gravitational force within the gravity chambers; and
a ring gear affixed to an outer cylindrical surface of the annular base of the first hub member, and having teeth that mesh with teeth on the drive mechanism.

6. The habitation module of claim 1 wherein:
the first circular side wall of the stationary structure includes a hatch; and
the stationary structure further includes a docking mechanism that encircles the hatch for attaching the stationary structure to a module of a space station.

7. The habitation module of claim 1 further comprising:
a counter-rotating mechanism that rotates about the axis in an opposite direction than the rotating structure.

8. The habitation module of claim 7 wherein:
the first circular side wall of the stationary structure includes a hatch; and
the counter-rotating mechanism includes:
  a cylindrical counter-weight that encircles the hatch; and
  a drive mechanism that rotates the cylindrical counter-weight about the axis in the opposite direction than the rotating structure.

9. The habitation module of claim 8 wherein:
the drive mechanism adjusts a rotational speed of the cylindrical counter-weight to compensate for a change in mass within the gravity chambers.

10. A habitation module comprising:
a stationary structure that includes:
  a first circular side wall;
  a second circular side wall spaced apart from the first circular side wall and aligned axially; and at least one support beam that attaches the first circular side wall and the second circular side wall; and
a rotating structure that attaches to the stationary structure through rotatable attachment members, and rotates about an axis in relation to the stationary structure, wherein the rotating structure includes:
 a cylindrical body that is substantially hollow and open at both ends;
 opposing end walls that are circular in shape and aligned with open ends of the cylindrical body;
 a first expandable side wall that extends between the cylindrical body and a first one of the opposing end walls, wherein the first expandable side wall and the first one of the opposing end walls represents a first gravity chamber;
 a second expandable side wall that extends between the cylindrical body and a second one of the opposing end walls, wherein the second expandable side wall and the second one of the opposing end walls represents a second gravity chamber;
 center openings in the cylindrical body that are coaxially aligned on opposing sides of the cylindrical body along an axis of rotation of the cylindrical body; and
 a first hub member and a second hub member that are permanently affixed to the cylindrical body on the opposing sides of the cylindrical body about the center openings;
a first radial seal that spans a first gap between the first hub member and the first circular side wall to form an air-tight seal around a circumference of the first circular side wall; and
a second radial seal that spans a second gap between the second hub member and the second circular side wall to form an air-tight seal around a circumference of the second circular side wall.

11. The habitation module of claim 10 wherein:
the rotatable attachment members comprise a pair of support bearings;
a first one of the support bearings connects the first hub member to the first circular side wall; and
a second one of the support bearings connects the second hub member to the second circular side wall.

12. The habitation module of claim 10 wherein:
the first hub member and the second hub member are saucer-shaped, and each includes:
 a rim;
 an annular base; and
 a continuous side wall that has a concave shape as it extends from the rim to the annular base;
 wherein the rim has a shape that corresponds with an outline of the center openings in the cylindrical body.

13. The habitation module of claim 12 wherein:
the rim of each of the first hub member and the second hub member is welded around the outline of a center opening in the cylindrical body.

14. The habitation module of claim 12 further comprising:
a drive mechanism configured to rotate the rotating structure about the axis in relation to the stationary structure to simulate a gravitational force within the first and second gravity chambers; and
a ring gear affixed to an outer cylindrical surface of the annular base of the first hub member, and having teeth that mesh with teeth on the drive mechanism.

15. The habitation module of claim 10 wherein:
the rotating structure further includes extension rods that guide the opposing end walls when they extend radially from the axis;
first extension rods are affixed at a first end to the cylindrical body, and are affixed at a second end to the first one of the opposing end walls;
second extension rods are affixed at a first end to the cylindrical body, and are affixed at a second end to the second one of the opposing end walls;
the rotating structure further includes first guide rings and second guide rings that are affixed to the cylindrical body;
the first extension rods pass through the first guide rings; and
the second extension rods pass through the second guide rings.

16. The habitation module of claim 15 wherein:
the rotating structure includes launch locks installed in the first guide rings and the second guide rings;
the launch locks in the first guide rings are tightened onto the first extension rods to secure the rotating structure in a contracted position; and
the launch locks in the second guide rings are tightened onto the second extension rods to secure the rotating structure in the contracted position.

17. The habitation module of claim 16 wherein:
the first end of the first extension rods are attached to the first guide rings to secure the rotating structure in an extended position; and
the first end of the second extension rods are attached to the second guide rings to secure the rotating structure in the extended position.

18. The habitation module of claim 10 wherein:
the rotating structure further includes:
 first guide rings that are affixed to the cylindrical body;
 second guide rings that are affixed to the first one of the opposing end walls; and
 first extension rods that pass through the first guide rings and the second guide rings; and
the rotating structure further includes:
 third guide rings that are affixed to the cylindrical body;
 fourth guide rings that are affixed to the second one of the opposing end walls; and
 second extension rods that pass through the third guide rings and the fourth guide rings.

19. The habitation module of claim 18 wherein:
a first end of the first extension rods attach to the first guide rings, and a second end of the second extension rods attach to the second guide rings to secure the rotating structure in an extended position; and
a first end of the second extension rods attach to the third guide rings, and a second end of the second extension rods attach to the fourth guide rings to secure the rotating structure in the extended position.

20. The habitation module of claim 10 wherein:
the first circular side wall of the stationary structure includes a hatch; and
the stationary structure further includes a docking mechanism that encircles the hatch for attaching the stationary structure to a module of a space station.

21. The habitation module of claim 10 further comprising:
a counter-rotating mechanism that rotates about the axis in an opposite direction than the rotating structure.

22. The habitation module of claim 21 wherein:
the first circular side wall of the stationary structure includes a hatch; and the counter-rotating mechanism includes:
- a cylindrical counter-weight that encircles the hatch; and
- a drive mechanism that rotates the cylindrical counter-weight about the axis in the opposite direction than the rotating structure.

23. The habitation module of claim 22 wherein:
the drive mechanism adjusts a rotational speed of the cylindrical counter-weight to compensate for a change in mass within the gravity chambers.

* * * * *